3,068,191
PRODUCT AND PROCESS FOR PREPARING RUBBER CONTAINING VINYL CROSSLINKED STYRENE RESIN OF HIGH IMPACT STRENGTH
Ernest Seijo, Sale, and Alec Norman Roper, Eccles, England, assignors to Shell Oil Company, a corporation of Delaware
No Drawing. Filed Nov. 27, 1957, Ser. No. 699,168
Claims priority, application Great Britain Nov. 23, 1956
14 Claims. (Cl. 260—45.5)

This invention relates to new thermoplastic polymeric compositions. More particularly, the invention relates to a process for preparing compositions comprising polymers of alkenyl-aromatic compounds having increased impact strength as compared to the conventional polymers of this type.

Specifically, the invention provides a new process for preparing compositions comprising polymers of alkenyl-aromatic compounds, and preferably compositions containing polystyrene having increased impact strength and good flexibility which comprises forming a dispersion of a synthetic elastomer possessing ethylenic unsaturation in a polymer of an alkenyl-substituted aromatic compound, adding to said dispersion a functional monomer and a polymerization catalyst, preferably capable of yielding diradicals on thermal decomposition, and continuing the mixing to permit chemical cross-linking by said monomer to occur within the resulting mix. The invention further provides the resulting high impact polymer compositions prepared by this method.

It is known that the impact strength of polystyrene can be improved by the incorporation therewith of a styrene-butadiene type synthetic rubber, i.e. a GR-S type of rubber. The blending of these components is conveniently carried out mechanically using a two-roll mill or a Banbury mixer. However, there is a definite upper limit to the amount of synthetic rubber which can be blended with polystyrene in this way since as the amount of rubber increases the tensile strength of the resulting composition drops and it ultimately becomes too flexible and insufficiently rigid for use as a molding material. Moreover, the presence of the rubber tends to cause a general deterioration in the appearance of the resulting molded articles, the surface of which becomes rougher and of increasingly pearlescent appearance as the amount of rubber in the blend increases.

The GR-S type synthetic rubbers are used for producing high impact strength polystyrene and they have an appreciable reinforcing action thereon. Certain high impact polystyrenes may contain a proportion of a cross-linked rubber; it is, however, difficult to obtain an adequate dispersion of a cross-linked rubber in polystyrene by purely mechanical means.

It is an objection of the invention, therefore, to provide a new process for preparing compositions containing polymers of alkenyl-substituted aromatic compounds having high impact strength. It is a further object to provide a new method for preparing compositions containing polymers of alkenyl-substituted aromatic compounds which have high impact strength and good flexibility. It is a further object to provide a method for preparing compositions containing polymers of alkenyl-substituted aromatic compounds that possess good appearance. It is a further object to provide a new process for preparing compositions containing polystyrene that have exceptionally high impact strength. Other objects and advantages of the invention will be apparent from the following detailed description thereof.

It has now been discovered that these and other objects may be accomplished by the process of the invention comprising forming a dispersion of a synthetic elastomer possessing ethylenic unsaturation in a polymer of an alkenyl-substituted aromatic compound, adding to said dispersion a functional monomer and a polymerization catalyst, preferably capable of yielding diradicals on thermal decomposition, and continuing the mixing so as to permit chemical cross-linking by said monomer to occur within the mix. The compositions prepared by this process have excellent tensile strength, good impact strength and yet still retain good flexibility and a fine appearance. Under the conditions of the process, the added monomer acts to cross-link the rubber dispersed in the polymer of the alkenyl-substituted aromatic compound and thereby increases the strength of the product, renders the rubber more compatible with the polymer and results in an improved appearance in the resulting molded article. Despite the aforementioned cross-linking, however, the overall product still retains its thermoplastic nature.

The alkenyl-substituted aromatic compound, polymers of which are utilized in the process of the invention, are those compounds having an alkenyl radical, and preferably a 1-alkenyl, e.g. a vinyl radical, attached to a ring carbon atom of an aromatic ring. Examples of these include, among others, styrene, alpha-methylstyrene, vinyl toluene, 2-chloro-styrene, 4-chlorostyrene, 2,4-dichlorostyrene and 2,5-dichlorostyrene. Particularly preferred are styrene, alpha-alkylstyrene and the nuclear chloro- and alkyl-substituted styrenes wherein the alkyl groups contain from 1 to 4 carbon atoms.

The polymers of the above-noted alkenyl-substituted aromatic compounds used in the process of the invention may be prepared by any suitable means. They are preferably prepared, for example, by heating the alkenyl-substituted aromatic compounds in the presence of peroxide catalyst such as benzoyl peroxide in bulk or in an aqueous emulsion system. Isotactic polymers prepared by the use of the Ziegler type catalysts may also be utilized but are less preferred.

The polymers of the alkenyl-substituted aromatic compounds are preferably the homopolymers of these monomers, but it is also intended to include copolymers wherein the alkenyl-substituted aromatic compounds have been polymerized with dissimilar ethylenically unsaturated monomers, preferably one containing a single $CH_2=C=$ group in an amount preferably not more than 20% by weight. Examples of such other monomers include acrylonitrile, vinyl chloride, vinylidene chloride, methyl methacrylate, ethyl methacrylate, butyl acrylate and the like.

The polymer of the alkenyl-substituted aromatic compounds to be used in the process preferably have molecular weights between about 20,000 to about 2,000,000 (as determined by the light scattering technique) and preferably have softening points of 80° C. to about 150° C.

The material to be combined with the above described polymers of the alkenyl-substituted aromatic compounds is a synthetic elastomer. These synthetic materials include rubbers, such as, for example, butadiene-styrene copolymers which are manufactured commercially under such names as GR-S 1000, GR-S 1500, GR-S 1600, GR-S 2000 and GR-S 2101 and the like, as well as rubber copolymers of butadiene and methyl methacrylate, 3,4-dichloroalphamethylstyrene, methyl isopropenyl ketone, vinyl pyridine and other related unsaturated monomers. Styrene-butadiene copolymers containing a high proportion of styrene, such as, for example, 40% to 80% styrene are particularly preferred materials to be used in preparing the compositions of the invention. Other synthetic rubbers include the neoprene rubbers, i.e. rubbers prepared from chloroprene, such as those known commercially as GR-M, neoprene type Gn, neoprene type E, neoprene Fr and the like. Isobutylene rubbers, such as those known in industry as GR-1 rubbers are also useful.

Also included are the elastomeric copolymers of diolefin and an acrylic nitrile. The preferred diolefins are the aliphatic conjugated diolefins having 4 to 6 diolefins, such as butadiene, isoprene, methyl pentadiene, dimethyl butadiene and the like. The acrylic nitrile is preferably acrylonitrile. The diolefin preferably makes up at least 40% and more preferably 60% to 80% of the copolymer.

Physical mixtures of two or more of the above-noted elastomers may also be used.

The above-described elastomers preferably have molecular weights varying from about 5,000 to 500,000 as determined by the light scattering technique described in Chem. Rev., vol. 40, page 319 (1949). Molecular weights may be controlled by the conventional use of chain transfer agents, such as isopropyl alcohol. The elastomeric copolymers may be prepared by conventional method. Preferred methods of preparation are described in U.S. 2,556,851 and in U.S. 2,618,626.

In addition to the synthetic rubber a proportion of a high styrene content styrene-butadiene resin not having elastomeric properties may also be present. Blends of styrene-butadiene rubbers and high styrene content styrene-butadiene resins are commercially available, an example being the material known as Polysar S–250, and such blends may be dispersed in the polymer of the alkenyl-substituted aromatic compound by mechanical mixing in accordance with the process of the present invention.

The amount of synthetic elastomer to be combined with the polymer of the alkenyl substituted aromatic compound is preferably between 5% to 30%, and more preferably between 15% and 25% by weight of the polymer of the alkenyl-substituted aromatic compound.

As noted above, the synthetic elastomer is dispersed in the polymer of the alkenyl-substituted aromatic compound. By dispersing is meant forming an intimate physical mixture of the two materials. This can be accomplished by any suitable mechanical means, such as by mixing or blending in conventional equipment such as a Banbury mixer or a roller mill with heated rollers or an extrusion mixer.

The mixing is preferably accomplished at temperatures ranging from about 90° C. to about 200° C.

The mixing time required to obtain the initial dispersion of the rubber in the polymer of the alkenyl-substituted aromatic compound on the one hand and the desired high impact material on the other will depend on the mixing conditions employed: for example, mixing times of between 5 and 10 minutes may be employed in forming the initial dispersion.

The functional ethylenically unsaturated monomers to be added to the dispersion of the polymer of the alkenyl-substituted aromatic compound and the rubber may be monoethylenically unsaturated or polyethylenically unsaturated, and may possess a variety of activating groups near the double bond or bonds, such as aromatic rings, ester linkages, ketone linkages, ether linkages and the like. Examples of such monomers include styrene, chlorostyrene, vinyl toluene, methyl methacrylate, ethyl arcylate, acrylonitrile, diallyl phthalate, divinyl succinate, diallyladipate, allyl vinyl ether, allyl butenyl ketone divinyl benzene, divinyl anthracene, vinyl allyl benzene and the like, and mixtures thereof. Particularly preferred monomers to be added are the esters of ethylenically unsaturated monohydric alcohols and mono-and dicarboxylic acids, alkenyl-substituted aromatic hydrocarbons, alkenyl alkyl and dialkenyl ethers and ketones and ethylenically unsaturated nitriles. Especially preferred are the compounds having a plurality of $CH_2=C=$ groups and especially the polyvinyl-substituted compounds, such as divinyl benzene.

A hydrocarbon diluent can also be present in admixture with the functional monomers, as for example, in the commercial divinyl benzene which contains ethyl styrene and diethyl benzene. Such a commercial mixture has been found to be entirely suitable as a source of divinyl benzene in carrying out the present process.

The amount of the functional monomer employed is conveniently between 0.1% and 10% by weight and preferably between 0.5% and 10% by weight of the amount of the synthetic elastomer. In the case of the polyfunctional monomers, the amount is preferably between 1% and 5% by weight of the synthetic elastomer.

The polymerization catalyst used in the process is preferably a peroxide catalyst and preferably one capable of yielding di-radicals, such as, for example, di-tert-butyl diperphthalate. However, other peroxide catalysts are suitable, such as, for example, benzoyl peroxide, di-tert-butyl peroxide, di-tert-butyl succinate, tert-butyl peracetate, di-tert-butyl dipermalonate, 2,2-bis(tert-butylperoxide)butane, and polymeric peroxides, e.g. produced by reacting acetyl acetone with hydrogen peroxide, ascaridol and the like. The amount of catalyst is conveniently between 0.05% and 5.0% by weight of the synthetic rubber and preferably between 0.1% and 1.0% by weight thereof.

Other ingredients may also be present in the compositions of the invention along with the above-described components, such as, for example, plasticizers as dibutyl sebacate and dioctyl phthalate; lubricants such as butyl stearate and white oils, anti-oxidants, fillers and coloring materials which are added for well known purposes.

After the functional monomer and polymerization catalyst, as well as any other desired material are added as noted above, are added to the dispersion of polymer of alkenyl-substituted aromatic compound and the synthetic rubber, the mixing, as by the above-noted mechanical means, is then continued at the appropriate temperature to effect decomposition of the catalyst and the polymerization of the functional monomer. If the initial dispersion is formed on two-roll mill, the catalyst and monomer can then be added and the mixing continued at the desired temperature. If the initial mixing is carried out in a Banbury mixer, the temperatures attained in the initial mixing stage sometimes are higher than on the two-roll mill and are usually such that the subsequent cross-linking reaction would take place too rapidly if the catalyst and the monomer were added immediately. Consequently, it is necessary either to cool the initial mixing to a suitable temperature, e.g. 100–160° C. or, preferably to discharge the mix onto a two-roll mill on which it is formed into a sheet which is then chopped into granules. These granules are then charged to the Banbury mixer, together with the catalyst and monomer and the process is completed at the desired temperature, e.g. 100–160° C. The exact temperature used will depend on the catalyst as each generally has a different decomposition range. Generally, the temperature will range from about 90° C. to about 175° C.

The new compositions of the invention have high impact strength, excellent tensile strength and elongation. As thermoplastic material it may be molded by various means as injection or extrusion molding techniques to form valuable plastic articles of commerce such as toys, combs, containers, parts for appliances, etc.

The invention is illustrated by the following examples. Unless otherwise indicated, parts are parts by weight.

*Example 1*

800 parts of polystyrene having a mol weight of about 150,000 were added slowly to a conventional two-roll mill, the rolls of which were heated to a temperature of 150–160° C., until a hide was obtained. To this hide 200 parts of a GR–S type cold rubber (butadiene-styrene copolymer containing about 23% styrene and mol wt. of about 200,000) were added slowly and when all the rubber had been incorporated in the hide the blend was worked for a further 5 minutes to form a good dispersion and then removed, cooled and ground to give a polystyrene molding composition which was subsequently molded into test specimens. This composition is referred to as composition A in the following table. A second blend was made in a similar manner except that when all the rubber had been incorporated, 2 parts of divinyl benzene were added during the 5 minute mixing period. The divinyl benzene was in the form of a commercial grade containing 52–56% of divinyl benzene, the remainder being ethyl vinyl benzene and diethyl benzene. The product was worked-up as before and the resulting molding composition (B) was molded into test speciments.

A third blend was prepared in a similar manner to the first blend except that 0.5 part of di-tert butyl diperphthalate was added during the five minutes mixing period and the resulting composition (C) was also molded into test specimens.

Finally a fourth blend was prepared by adding to the polystyrene-butadiene/styrene copolymer blend noted in the first paragraph of this example during the five minutes mixing period 2.0 parts of divinyl benzene and 0.5 part of di-tert butyl diperphthalate. It was observed that in this last case the hide on the rolls, immediately after the addition became rough, but this gradually disappeared and when the hide was removed from the rollers it was much smoother than in the other three cases. This final blend (D) was molded into test specimens as before. The various specimens were subjected to a number of physical tests, the results of the tests being given in the following table, in which the impact strength tests were carried out on ½ x ¼" bars notched to BS1493 specification, and the tensile tests on specimens to ASTM specification D638–52T.

| Test Specimens | Izod Impact Strength in ft. lbs. per inch notch | Tensile Strength in pounds per square inch | Elong'n | Molding Properties |
|---|---|---|---|---|
| A | 0.76 | 4,488 | 19.3 | Rough pearlescent surface. |
| B | 0.80 | 4,000 | 18.5 | As above. |
| C | 1.88 | 4,340 | 38.9 | Fairly smooth surface. Slight pearlescence. |
| D | 3.32 | 4,800 | 20.5 | Smooth surface slightly matt. No pearlescence. |

It will be apparent from these results that the use of either divinyl benzene or the catalyst alone does not give the required results, and that accordingly it is necessary to use both in combination.

*Example II*

A. 87½ pounds of polystyrene containing 3½% of butyl stearate was compounded with 20 pounds of the synthetic rubber described in Example I in a Banbury mixer for 8 minutes at the end of which time the mix had reached a temperature of 200° C. The resulting dough was then sheeted on a two-roll mill and the sheet comminuted into small particles as used for molding powders. 100 pounds of this premix was charged to the Banbury mixer together with 425 grams of the commercial grade divinyl benzene referred to in Example I and 42.5 grams of a 50% solution of di-tert-butyl diperphthalate in dibutyl phthalate and the resulting mix compounded for 4 minutes. 180 grams of an anti-oxidant 2-methyl-cyclohexyl-4-methyl-6-tertiary butyl phenol (Nonox WSL) were then added and the compounding continued for a further 2 minutes at the end of which time the plastic mass had attained a temperature of 200° C. The plastic mass was discharged onto sheeting rollers and comminuted into a molding powder.

B. Another charge was run in substantially the same manner as (A), but omitting the divinyl benzene and the catalyst.

The resulting products from these two runs (A and B) were subjected to various physical tests as in the previous example and were found to have the following properties:

|  | A | B |
|---|---|---|
| Izod Impact Strength, ft. lbs. per inch notch | 2.20 | 0.80 |
| Tensile Strength, lbs. per square inch | 3,410 | 3,120 |
| Elongation (percent) | 44.6 | 27.3 |

Plates 4' x 14" and of 1/10" thickness were molded from both compositions in an injection molding machine. A molding from composition A was smooth and of attractive finish and could be bent at 180° C. for 10 or more times before breakage occurred. On the other hand the moldings made from composition B had a rough and pearlescent surface and usually broke at the second flexing.

*Example III*

Three high impact compositions (designated E, F, G) were made from polystyrene containing 3½% butyl stearate. The polystyrene was in each case blended with 20% by weight of GRS type cold rubber described in Example I by the method described in Example I, the initial dispersion being carried out for a period of 10 minutes. Di-tert-butyl diperphthalate in the form of 0.5% by weight based on the rubber, of the catalyst composition shown in Example II was then added, together with 5% by weight of a monomer also based on the rubber. The monomers used were styrene (E), diallyl phthalate (F) and divinyl benzene (G) respectively and the resulting blends were worked for a further five minutes to form a good dispersion after which they were removed, cooled and ground to give polystyrene molding compositions which were molded into test specimens. These test specimens (E, F, G) were subjected to a number of physical tests and the results of the tests are given in the following table.

In addition to the usual tests the flexural strength was determined according to ASTM specification D790–49T.

| Test Specimen | Izod Impact Strength in ft. lbs. per inch notch | Tensile Strength in pounds per square inch | Elongation (percent) | Flexural Strength in lbs. per square inch |
|---|---|---|---|---|
| E | 2.21 | 3,440 | 44.0 | 5,760 |
| F | 2.65 | 3,230 | 37.5 | 5,620 |
| G | 2.78 | 3,400 | 41.9 | 6,050 |

*Example IV*

Two compositions (H and I) were prepared from polystyrene (incorporating 3½% butyl stearate as a lubricant) and 40% by weight of a styrene-butadiene copolymer containing about 54% styrene by mixing these components for 10 minutes in the manner described in Example III and in the case of composition H, thereafter adding to the resulting dispersion 2.5% of divinyl benzene and 0.25% of the catalyst composition shown in Example II (percentages being by weight of elastomer) and mixing for a further 5 minutes. In each case the resulting blends were cooled and ground to give polystyrene molding compositions (H and I) having the following physical properties:

|  | Composition H | Composition I |
|---|---|---|
| Izod Impact Strength, ft. lbs. per inch notch | 3.37 | 0.62 |
| Tensile Strength, pounds per square inch | 3,120 | 3,300 |
| Elongation, percent | 16.3 | 14.3 |
| Flexural Strength, pounds per square inch | 5,760 | 6,480 |

We claim as our invention:

1. A process for preparing polymer compositions having high impact strength which consists of mixing (1) from 5% to 30% by weight, based on the weight of the hereinafter described solid polymer of an alkenyl-substituted aromatic compound, of a synthetic rubber possessing ethylenic unsaturation and selected from the group consisting of rubbery polymers of butadiene, rubbery polymers of chloroprene and rubbery polymers of isobutylene, with (2) a solid polymer selected from the group consisting of (a) homopolymers of alkenyl-substituted aromatic compounds wherein the alkenyl group is attached through a carbon atom to a carbon atom of the aromatic ring, and (b) copolymers of said alkenyl-substituted aromatic compound and dissimilar compound possessing a single $CH_2=C=$ group, and selected from the group consisting of unsaturated nitriles, vinyl halides and lower alkyl acrylates, said copolymer containing at least 80% by weight of the units of the alkenyl-substituted aromatic compound, continuing the mixing until a solid intimate physical mixture of the synthetic rubber and the polymer of the alkenyl-substituted aromatic compound is obtained, and then adding to said solid intimate mixture from 0.1% to 10% by weight, based on the weights of the synthetic rubber, of an ethylenically unsaturated monomer having a terminal $CH_2=C=$ group and selected from the group consisting of esters of ethylenically unsaturated monohydric alcohols and monocarboxylic acids, esters of ethylenically unsaturated monohydric alcohols and dicarboxylic acids, alkenyl-substituted aromatic hydrocarbons, alkenyl alkyl ethers, dialkenyl ethers, alkenyl alkyl ketones, dialkenyl ketones and ethylenically unsaturated nitriles, and a peroxide polymerization catalyst, and continuing the said mixing at a temperature between 90° C. and 208° C. to permit chemical cross-linking by said monomer to occur within the resulting mixture.

2. A process as in claim 1 wherein the alkenyl-substituted aromatic compound is styrene.

3. A process as in claim 1 wherein the ethylenically unsaturated monomer is divinylbenzene.

4. A process as in claim 1 wherein the unsaturated synthetic rubber is a copolymer of butadiene and styrene containing less than 50% by weight of styrene.

5. A process as in claim 1 wherein the synthetic rubber consists of a butadiene-styrene copolymer.

6. A process for preparing a thermoplastic styrene polymer composition having increased impact strength which consists of mixing a solid homopolymer of styrene with from 5% to 30% by weight based on the weight of said homopolymer of styrene of a butadiene polymer until a solid intimate physical mixture of the styrene polymer and butadiene polymer is obtained, adding to the mixture from 0.1% to 10% by weight of the butadiene polymer of an ester of an ethylenically unsaturated monohydric alcohol and a dicarboxylic acid and a peroxide polymerization catalyst, and continuing the mixing at a temperature of 100–160° C. to effect cross-linking of the unsaturated monomer with the mixture.

7. A process as in claim 6 wherein the ester of the unsaturated monohydric alcohol and dicarboxylic acid is diallylphthalate.

8. A process as in claim 6 wherein the ester of the unsaturated monohydric alcohol and dicarboxylic acid is used in an amount varying from 0.1% to 5% by weight of the butadiene polymer.

9. A process consisting of mixing from 5% to 30% by weight based on the hereinafter described polystyrene of a butadiene-styrene copolymer with a solid polystyrene until a solid intimate physical mixture of the polystyrene and butadiene-styrene rubber is obtained at a temperature between 100° C. and 200° C., adding from 0.1% to 10% by weight of the butadiene-styrene copolymer of divinyl benzene, and 0.05% to 5.0% of a peroxide polymerization catalyst, and continuing the mixing at a temperature of 100° C. to 160° C. to effect the cross-linking of the divinyl benzene with the mixture.

10. A process consisting of mixing from 5% to 30% by weight based on the hereinafter described polystyrene of a butadiene-styrene copolymer with a solid polystyrene until a solid intimate physical mixture of the polystyrene and butadiene-styrene rubber is obtained at a temperature of 100° C. to 200° C., adding from 0.1% to 10% by weight of the butadiene-styrene copolymer of styrene monomer and 0.1% to 5% of a peroxide polymerization catalyst, and continuing mixing at a temperature of 100° C. to 160° C. to effect the polymerization of the styrene with the mixture.

11. A process as in claim 10 wherein the peroxide catalyst is di-tert-butyl diperphthalate.

12. A high impact polymer compostion prepared by the process of claim 1.

13. A high impact polymer composition prepared by the process of claim 9.

14. A high impact polymer composition prepared by the process of claim 10.

References Cited in the file of this patent

UNITED STATES PATENTS

| | | |
|---|---|---|
| 2,388,319 | Fuller | Nov. 6, 1945 |
| 2,609,353 | Rubens et al. | Sept. 2, 1952 |
| 2,623,863 | Dieckmann et al. | Dec. 30, 1952 |
| 2,700,185 | Lee | Jan. 25, 1955 |
| 2,981,650 | Bader et al. | Apr. 25, 1961 |

FOREIGN PATENTS

| | | |
|---|---|---|
| 745,901 | Great Britain | Mar. 7, 1956 |
| 757,523 | Great Britain | Sept. 19, 1956 |
| 766,585 | Great Britain | Jan. 23, 1957 |
| 525,041 | Canada | May 15, 1956 |

OTHER REFERENCES

Industrial and Engineering Chemistry, November 1953, page 2538.